US008117988B2

(12) United States Patent
Oliver

(10) Patent No.: US 8,117,988 B2
(45) Date of Patent: Feb. 21, 2012

(54) ROTARY PARLOUR FOR MILKING OF ANIMALS

(75) Inventor: Christopher K Oliver, Hamilton (NZ)

(73) Assignee: DeLaval Holding AB, Tumba (SE)

( * ) Notice: Subject to any disclaimer, the term of this patent is extended or adjusted under 35 U.S.C. 154(b) by 90 days.

(21) Appl. No.: 12/375,130

(22) PCT Filed: Jun. 20, 2007

(86) PCT No.: PCT/SE2007/050442
§ 371 (c)(1),
(2), (4) Date: Apr. 28, 2009

(87) PCT Pub. No.: WO2008/013496
PCT Pub. Date: Jan. 31, 2008

(65) Prior Publication Data
US 2009/0266301 A1 Oct. 29, 2009

(30) Foreign Application Priority Data

Jul. 27, 2006 (SE) .................................. 0601611-7

(51) Int. Cl.
*A01K 1/12* (2006.01)
*A01J 5/00* (2006.01)
(52) U.S. Cl. .................................................... 119/14.04
(58) Field of Classification Search .... 119/14.01–14.04, 119/14.08
See application file for complete search history.

(56) References Cited

U.S. PATENT DOCUMENTS

| | | | | |
|---|---|---|---|---|
| 2,267,510 A * | 12/1941 | Swihart et al. | ................ | 198/687 |
| 3,106,825 A * | 10/1963 | Barall et al. | .................... | 405/300 |
| 3,261,323 A * | 7/1966 | Steelhammer | ............. | 119/14.04 |
| 3,765,373 A * | 10/1973 | Phillips | ...................... | 119/14.04 |
| 3,860,171 A | 1/1975 | Mastronardi | | |
| 4,207,821 A * | 6/1980 | Beckert | ......................... | 104/119 |
| 6,389,982 B1 * | 5/2002 | Evensen | ......................... | 104/124 |
| 7,017,516 B2 * | 3/2006 | Eriksson | ................... | 119/14.04 |
| 2003/0150389 A1 * | 8/2003 | Christensen | ................ | 119/14.02 |
| 2005/0166851 A1 * | 8/2005 | Holscher et al. | ........... | 119/14.04 |

FOREIGN PATENT DOCUMENTS

| | | |
|---|---|---|
| AU | 1997176 | 6/1998 |
| CA | 2218464 A1 | 2/1998 |
| DE | 4101530 | 7/1992 |

OTHER PUBLICATIONS

International Search Report dated Sep. 28, 2007, in PCT application.
Extended European Search Report, dated Aug. 3, 2011, in EP 07748602.

* cited by examiner

*Primary Examiner* — Rob Swiatek
*Assistant Examiner* — Ebony Evans
(74) *Attorney, Agent, or Firm* — Young & Thompson

(57) ABSTRACT

The invention relates to a rotary platform for milking of animal. The rotary parlor comprises a platform (3), a circular rail member (10) connected to a lower surface of the platform (3) and a plurality of rolling members (11) having a wear surface (11') adapted to be in contact with a wear surface (10b") of the rail member (10). The rail member (10) comprises a first part (10a, 17, 18a, b) connected to the platform (3), a second part (10b, 18c) comprising said wear surface (10b") and a connection arranged between said first part (10a, 17, 18a, b) of the rail member and said second part (10b, 18c) of the rail member, which connection is adapted to allow angular movements between the first part (10a, 17, 18a, b) and the second part (10b, 18c) of the rail member (10).

21 Claims, 3 Drawing Sheets

ROTARY PARLOUR FOR MILKING OF ANIMALS

THE BACKGROUND OF THE INVENTION AND PRIOR ART

The present invention relates to a rotary parlour for milking of animals, wherein the rotary parlour comprises an platform having a surface to support animals to be milked, a circular rail member connected to a lower surface of the platform and a plurality of rolling members having a wear surface adapted to be in contact with a wear surface of the rail member such that the platform is rotatably arranged on the rolling members.

A conventional rotary parlour comprises a circular rail member provided with a substantially plane wear surface to be in contact with corresponding plane wear surfaces of rolling members arranged on the underside of the platform. During operation of the rotary parlour, parts of the platform will be deflected by the weight of the cows. The deflection of the platform occurs especially when the cows walk on and leave the platform. Such deflections of the platform may result in locally turning motions of the rail member such that the platform achieves an unstable motion on the rolling members. The turning motions of the rail member cause angular adjustments of the plane wear surface of the rail member in relation to the plane wear surfaces of the rolling members. The contact surface between the wear surfaces is thereby reduced and high local contact pressures are created. The high local contact pressures result in an uneven wearing of the wear surfaces and risk for formation of stress cracks.

Further, the angular adjustments of the rail member result in asymmetrical loads on the roller members. Thereby, the life length of bearings of the roller members can be reduced. Furthermore, the asymmetrical loads also act on weld joints located in the vicinity of the wear surfaces. Weld cracking can occur in such weld joints. The wear surface of a conventional rail member wearing out when about 5 to 10 million cows has been milked on the rotary parlour.

SUMMARY OF THE INVENTION

The object of the present invention is to provide a circular rail member for a rotary parlour for milking of animals, which has a wear surface with has a longer working life than conventional wear surfaces of rail members and which is possible to exchange in a relative simple manner.

This object is achieved by the arrangement initially defined, which is characterised in that the rail member comprises a first part connected to the platform, a second part comprising said wear surface and a connection arranged between said first part of the rail member and said second part of the rail member, which connection is adapted to allow angular movements between said parts of the rail member. When the platform is deflected under the weight of the animals, the first part of the rail member will perform an angular movement in relation to the second part of the rail member. Thereby, it is possible for the wear surface of the rail member to be still in a position in which it has an optimal contact with the wear surfaces of the roller members. Consequently, no angular adjustments between the wear surfaces are created. Thereby, the wear of the wear surfaces of the rail member and the roller members is reduced. Thus, the wear surfaces will have a longer working life. Furthermore, such a design of the rail member eliminates substantially the existence of asymmetrical loads acting on the roller members. In that way, the working life of the bearings of the roller members and adjacently located weld joints will be increased. Since, the rail member has a separate second part comprising the wear surface, it is not necessary to dismount and exchange the whole rail member, if the wear surface has been wearing out. Furthermore, it is possible to provide a connection with a design such that is easy to dismount the second part of the rail member from the first part of the rail member.

According to an embodiment of the invention, said connection comprises a contact surface of the first part of the rail member adapted to be in contact with a contact surface of the second part of the rail member, wherein the said contact surfaces are so shaped such that angular movements between said parts of the rail member is allowed. Consequently, the contact surfaces has to have shapes working together in a manner such that it is possible to achieve angular movements between said parts of the rail member. The contact surface of the first part of the rail member may have at least partly a convex shape. It is necessary that at least one of said contact surfaces is convex in order to allow angular movements between said parts of the rail member. The contact surface of the second part of the rail member may have at least partly a plane shape. A plane contact surface is easy to manufacture and it works very well together with a convex contact surface in order to accomplish an angular adjustment between said parts of the rail member. Alternatively, the contact surface of the second part has at least partly a convex shape and the contact surface of the first part has at least partly a plane shape. According to another alternative, one of the contact surfaces has a convex shape and the other contact surface has correspondingly concave shape.

According to a further embodiment of the invention, said connection comprises at least one bonding adapted to hold the first part of the rail member and the second part of the rail member in a connected state. The connection has to have a construction such that it holds the first part and the second part of the rail member together at the same time as it does not prevent said mutual adjustment movements between the parts. Preferably, said connection comprises a plurality of bondings arranged at different positions along the circular rail member. Such bondings may be substantially rigid. Thereby, mutual adjustment movements are only allowed in the parts of the rail member located between the bondings. If the areas of the bondings have a substantially negligible extension in relation to the intermediate areas, it is possible to allow mutual adjustment movements in nearly the whole rail member. Alternatively, the bonding may have a design such that it achieves elastic properties.

According to a further embodiment of the invention, said bonding comprises a plate member having an extension between an attachment to the first part of the rail member and an attachment to the second part of the rail member. Such a plate member may be of a suitable metal material. The plate member may be attached to the first part of the rail member and to the second part of the rail member by weld joints. In such a manner, it is possible to give the plate members a strength and relatively simple attachment to the respective parts of the rail member.

According to a further embodiment of the invention, the second part of the rail member comprises an elongated wear strip. Such a wear strip may be manufactured of a wear resistant material such as steel, nylon or a suitable plastic material. Preferably, the wear strip comprises at least a part of the contact surface of the second part of the rail member. Thereby, the wear strip comprises both a wear surface adapted to be in contact with the rolling members and a contact surface adapted to be in contact with the contact surface of the first part of the rail member. The first part of the rail member may comprise a beam element. Beam elements with a suitable cross-section are normally used as rail members of platforms of rotary milking parlours. The beam element may comprise at least a part of the contact surface of the first part of the rail member. The surface of the beam, which normally is used as wear surface in contact with the roller members, may be used as contact surface in the connection between the parts of the rail member. The first part of the rail member may comprise a protecting element comprising least a part of the contact surface of the first part of the rail member. The protecting element can be attached to the beam element by welding.

According to a further embodiment of the invention, the first part of the rail member comprises two elongated rod elements arranged side by side at a distance from each other and the second part of the rail member comprises one elongated rod element adapted to be position in the space between the rod elements of the first part of the rail member. The two rod elements of the first part may have a circular cross section area and the rod element of the second part may have a rectangular cross section area. A connection between the first part and the second part of the rail member comprising such rod elements allow angular movements between the parts of the rail member at the same time as it prevents lateral movements between the parts. Alternatively, the second part of the rail member may comprise the two elongated rod elements arranged side by side at a distance from each other and the first part of the rail member may comprise the elongated rod element adapted to be position in the space between the rod elements of the first part of the rail member. Angular movements between the parts of the rail member are also in this case allowed at the same time lateral movements between the parts are prevented.

According to a further embodiment of the invention, the wear surface of the rail member and the wear surface of the rolling member are plane. Thereby, the loads derived from the weight of the animals and the platform can be distributed on a relatively large surface of the rolling members.

BRIEF DESCRIPTION OF THE DRAWINGS

The present invention is now to be explained more closely by means of preferred embodiments, which are disclosed as examples, and with reference to the attached drawings.

BRIEF DESCRIPTION OF PREFERRED
EMBODIMENTS OF THE INVENTION

Figure 1:
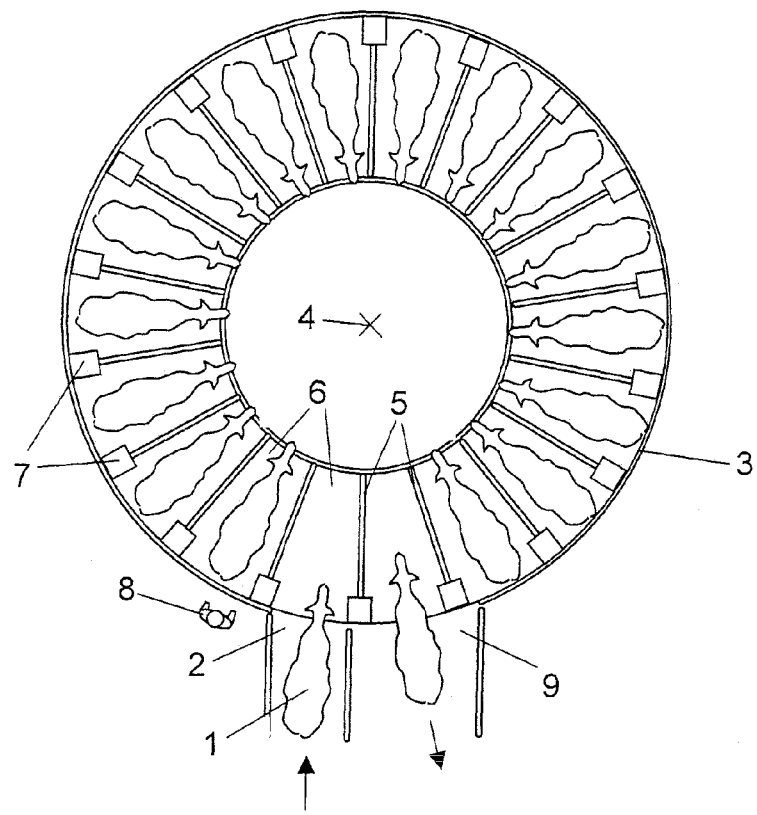
FIG. 1 shows a rotary parlour for milking of cows.

FIG. 1 shows a rotary parlour for milking of cows 1. The cows 1 to be milked walks through an entry 2 to enter an annular platform 3. The platform 3 is rotatably arranged around a substantially vertical axis 4. A plurality of fence arrangements 5 are mounted on the platform, which divide the platform 3 into stalls 6 for receiving individual cows 1. In this case, the fence arrangements 5 have a substantially radial extension on the platform 3 in relation to the vertical axis 4.

Cabinets 7 are arranged at an outer radial position of the platform 3. In this case, the cabinets 7 constitute a supporting element of the fence arrangements 5. Each cabinet 7 has an inner space, which may accommodate milking equipment and other components in the stall 6. In this case, the stalls 6 are arranged such that the cows face inwards from the stalls 6 and operators 8 work from the outside of the annular platform 3. An operator 8 may, for example, attach milking members to the cows 1 when they have entered a stall 6. The cows rotate nearly 360° on the platform 3 during a milking operation. The cows 1 leave the stall 6 and the platform 3 through an exit 9 after having been milked and possibly fed during the milking operation.

Figure 2:
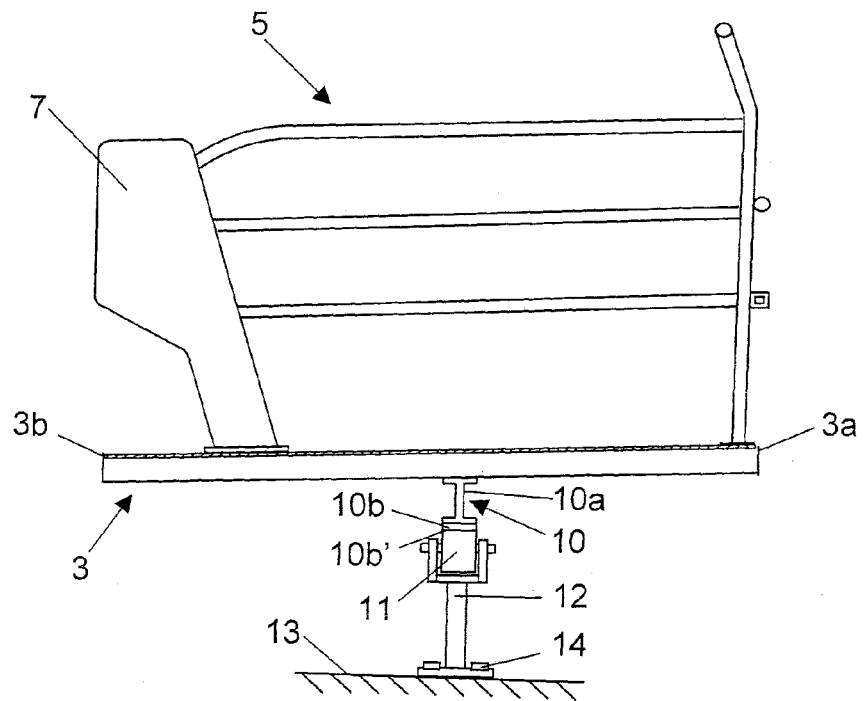
FIG. 2 shows a sectional view of a part of a platform of a rotary parlour and,
FIG. 3 shows a side view of a platform rail provided with a rail member according to a first embodiment of the invention.

FIG. 2 shows a sectional view through a part of the annular platform 3. In this case, the platform 3 is made of steel. The platform 3 has a substantially plane upper surface for supporting cows 1 to be milked. An inner circumference edge 3a of the annular platform 3 is located at a somewhat higher level than an outer circumference edge 3b of the platform 3. Consequently, the upper surface of the platform 3 has a smooth slope in relation to a horizontal plane. Thereby, it is easy to clean the platform 3 since water and dirt rinse off easily. One fence arrangement 5 and one cabinet 7 are shown in FIG. 2.

A rail member 10 is mounted on an underside of the platform 3. The rail member 10 has a circular extension on the underside of the platform 3. The rail member 10 comprises a first part comprising a track element 10a which constitutes the main part of the rail member 10. The track element 10a is fixedly connected to a beam or the like on the underside of the platform 3 by welding. The rail member 10 comprises at a lower portion a second part comprising a wear strip 10b. The wear strip 10b is provided with a wear surface 10b' adapted to be in contact with a wear surface 11' of a plurality of rollers 11 arranged in stands 12 in different positions under the rail member 10. One stand 12 with one roller 11 is shown in FIG. 2. The stand 12 is attached on a floor 13 by means of bolts 14. The platform 3 may be driven by means of a not disclosed drive unit. The drive unit may comprise drive wheels adapted to be in contact with the vertical sides surfaces of the track element 10a.

Figure 3:
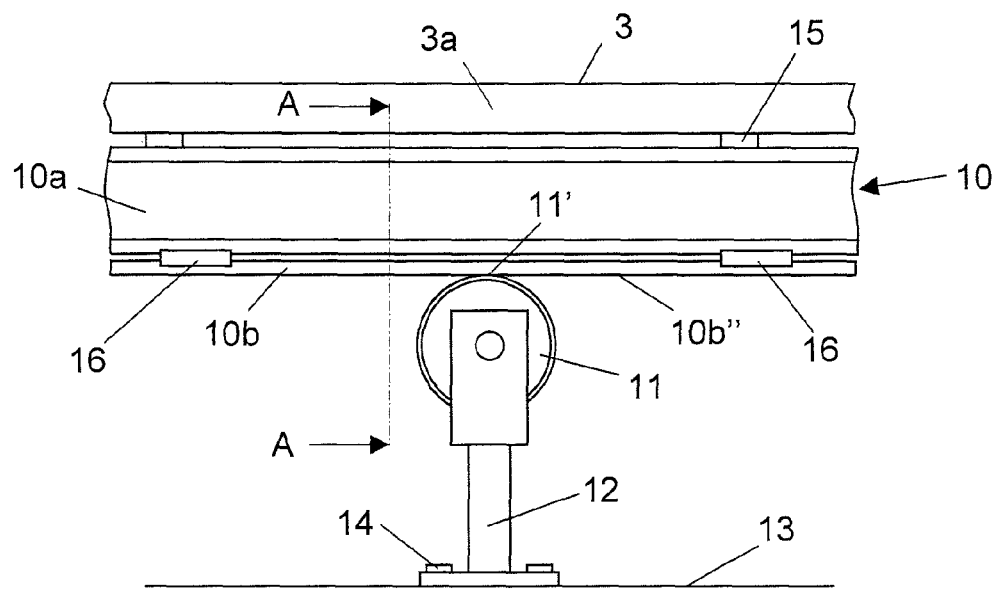

FIG. 3 shows a part of an annular platform 3 seen from the inside of the platform 3. Thereby, an inner circumference edge 3a of the annular platform 3 is visible. This platform 3 is formed by concrete. A circular rail member 10 is connected the platform 3 by means of a number of steel rods 15 or the like. An upper portion of the steel rods 15 is cast into the concrete platform 3 and a lower portion of the steel rods 15 are welded to an upper portion of the track element 10a. Thereby, the track element 10a is fixedly connected to the platform 3. A plurality of metal plates 16 are arranged with predetermined intervals along the extension of the rail member 10. The metal plates 16 are arranged on both sides of the rail member 10. An upper portion of the metal plates 16 is fixedly connected to the track element 10a. A lower portion of some of the plates 16 is fixedly connected to the wear strip 10b. These metal plates 16, which are both fixedly connected to the track element 10a and to the wear strip 10b, constitute bondings adapted to hold the track element 10a and the wear strip 10b in a connected state. However, the main part of the metal plates 16 is only fixedly connected to the track element 10a. The lower portions of these metal plates 16 are adapted to prevent lateral movements of the wear strip 10b in relation to the track element 10a. Preferably, the metal plates 16 are fixedly connected to the track element 10a and the wear strip 10b by means of weld joints.

Figure 4:
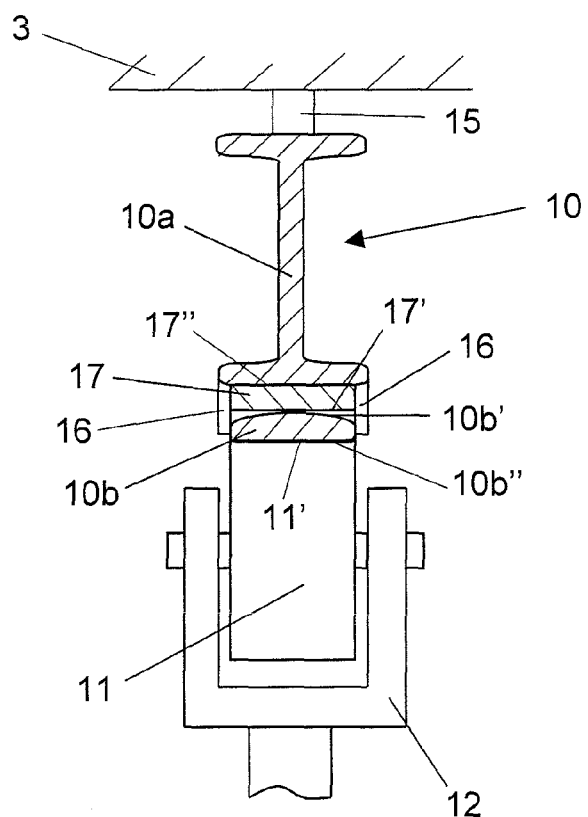
FIG. 4 shows a view along the plane A-A in FIG. 3.

FIG. 4 shows a view along the plane A-A I FIG. 3. A protecting element in the form of an elongated flat bar element 17 is connected to the track element 10a, for example, by means of suitably arranged weld joints. The elongated flat bar element 17 has a rectangular cross section with a plane lower surface 17' and a plane upper surface 17". The lower surface 17' is adapted to constitute a first contact surface of the first part 10a of the rail member 10. The upper surface 17" is adapted to be mounted in contact with a correspondingly shaped surface 10a' of the track element 10a. The object of the flat bar element 17 is to protect the surface 10a' of the track element 10a from wear.

The metal plates 16 are arranged both at the inner radial surface and at the outer radial surface of the circular rail member 10. The wear strip 10b comprises a convex contact surface 10b' adapted to be in contact with the plane contact surface 17' of the flat bar element 17. The wear strip 10b comprises a plane wear surface 10b" adapted to be in contact with a plane wear surface 11' of the respective rollers 11.

During operation of the rotary parlour, the annular platform 3 will be locally deflected by the weight of the cows. Thereby, the track element 10a, which is fixedly connected to the platform 3, achieves corresponding turning and displacement motions. However, the wear strip 10b of the rail member is only connected to the track element 10a at certain positions by means of some of the metal plates 16. Thereby, it is possible for the wear strip 10b to provide angular movements in relation to the first part 10a, 17 of the rail member in the areas located between said metal plates 16. The angular movements are controlled by the shape of the contact surfaces 17' of the flat bar element 17 and the shape of the contact surface 10b' of the wear strip 10b. This angular mobility between the first part 10a of the rail member and the wear strip 10b make it possible for the plane wear surface 10b" of the wear strip 10b to be in a continuous optimal contact with the plane contact surface 11' of the rollers 11 even if the track element 10a provides turning or displacement movements. Thereby, the platform 3 will obtain a stable motion on the rollers 11 and the wear of the wear surface 10b" of the wear strip 10b and the wear surfaces 11' of the roller 11 will be decreased. Since the wear strip 10b is connected to the track element 10a only at certain position along the extension of the rail member, it is relatively simple to dismount the wear strip 10b from the track element 10b when the contact surface 10b' of the wear strip 10b has been wearing out.

Figure 5:
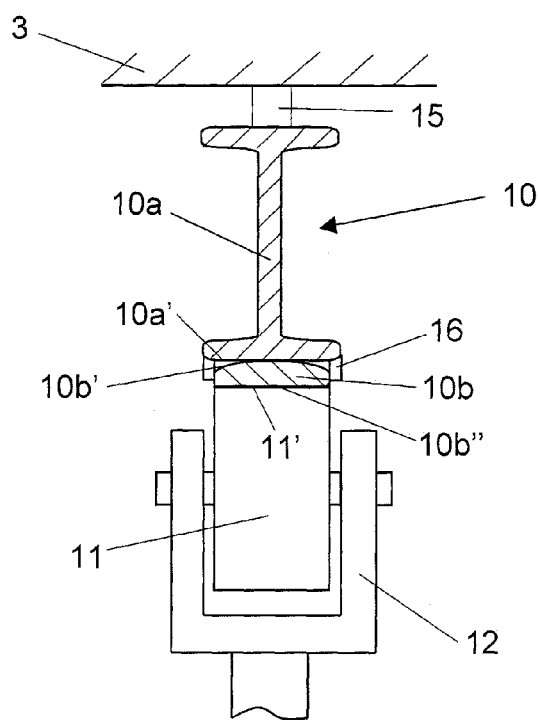
FIG. 5 shows a rail member according to an alternative embodiment of the invention and
FIG. 6 shows a rail member according to a further alternative embodiment of the invention.

FIG. 5 shows an alternative embodiment of the rail member 10. In this case, the plane surface 10a' of the track element 10a consists the contact surface with the convex surface 10b' of the wear strip 10b. Consequently, the flat bar element 17 has been excluded.

Figure 6:
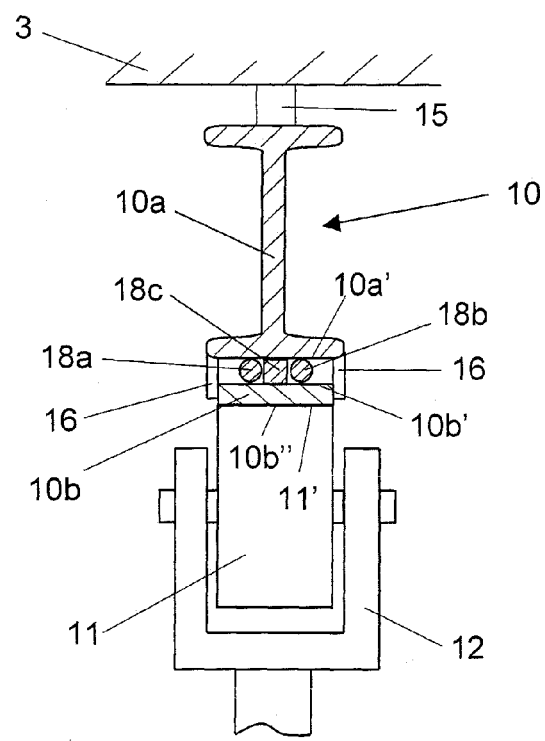

FIG. 6 shows a further embodiment of the rail member 10. One elongated rod 18c with a rectangular cross section area has here been fixedly connected to the plane surface 10b' of the wear strip 10b. Two elongated rods 18a, b with circular cross section areas have been fixedly connected to the plane surface 10a' of the track element 10a. The circular rods 18a, b are arranged at a distance from each other such that it is possible to insert the rectangular rod 18c in the space between the circular rods 18a, b. The rod elements 18a-c can be attached to the track element 10a and the wear strip 10b by welding. In this case, the first part of the rail member 10 comprises the track element 10a and the circular rods 18a, b which have surfaces forming a contact surface of the first part of the rail member 10. The second part of the rail member 10 comprises the wear strip 10b and the rectangular rod 18c, which has a surface forming a contact surface of the second part of the rail member 10. Said contact surfaces allow angular movements between the first part of the rail member 10 and the second part of the rail member 10. Since the rectangular rod 18c is arranged in a position between the circular rods 18a, b, lateral movements between the first part of the rail member 10 and the second part of the rail member 10 are obstructed in an effective manner. Alternatively, the circular rods 18a, b will be fixedly connected to the wear strip 10b and the rectangular rod 18c will be fixedly connected to the track element 10a. In this case, the circular rods 18a, b and the wear strip 10b form the contact surface of the second part of the rail member 10. The rectangular rod 18c and the track element 10a form the contact surface of the first part of the rail member 10.

The invention is not restricted to the described embodiment in the figures, but may be varied freely within the scope of the claims.

The invention claimed is:

1. A rotary parlour for milking of animals, the rotary parlour comprising:
    a platform (3) having a surface to support animals (1) to be milked;
    a continuously circular rail member (10) connected to a lower surface of the platform (3); and
    a plurality of rolling members (11) having a wear surface (11') in contact with a wear surface (10b") of the rail member (10), wherein,
    the platform (3) is rotatably arranged on the rolling members (11),
    the rail member (10) comprises
    i) a first part (10a, 17, 18a, 18b) connected to the platform (3), the first part being continuously circular in plan view on the underside of the platform and including a lower horizontal extension (10a),
    ii) a second part (10b, 18c) comprising an elongated circular wear strip (10b) located in vertical alignment with the lower horizontal extension (10a), the wear strip having an upper wear surface (10b') and said lower wear surface (10b"), the second part being circular in plan view on the underside of the platform, and
    iii) a connection arranged between said horizontal extension of said first part (10a, 17, 18a, 18b) of the rail member and said wear strip of said second part (10b, 18c) of the rail member, the first part, the second part, and the connection being vertically aligned, said connection adapted to allow vertical angular movements between the first part (10a, 17, 18a, 18b) and the second part (10b, 18c) of the rail member (10).

2. A rotary platform according to claim 1, wherein said connection comprises a lower contact surface (10a', 17', 18a, b) of the first part (10a, 17, 18a, b) of the rail member non-fixedly in contact with an upper contact surface (10b', 18c) of the wear strip of the second part (10b, 18c) of the rail member, wherein said contact surfaces are so shaped such that angular movements between the first part (10a, 17, 18a, b) and the second part (10b, 18c) of the rail member (10) is allowed, and the wear strip of the second part of the rail member is dismountable from the first part of the rail member.

3. A rotary platform according to claim 2, wherein the first part of the rail member comprises a beam element (10a).

4. A rotary platform according to claim 3, wherein the beam element (10a) comprises at least a part of the lower contact surface (10a') of the first part of the rail member (10).

5. A rotary platform according to claim 3, wherein the first part of the rail member comprises a protecting element (17) comprising at least a part of the lower contact surface (17') of the first part of the rail member (10), the protecting element (17) being in contact with the wear strip (10b).

6. A rotary platform according to claim 3, wherein the wear surface (10b") of the rail member and the wear surface (11') of the rolling member (11) are plane.

7. A rotary platform according to claim 1, wherein the contact surface of the first part (10a, 17, 18a, b) of the rail member has at least partly a convex shape adjacently facing the wear strip.

8. A rotary platform according to claim 7, wherein the contact surface of the second part (10b, 18c) has at least partly a plane shape adjacently facing the convex shape of the first part.

9. A rotary platform according to claim 1, wherein the contact surface of the second part (10b, 18c) has at least partly a convex shape adjacently facing the first part.

10. A rotary platform according to claim 9, wherein the contact surface of the first part (10a, 17, 18a, b) of the rail member has at least partly a plane shape adjacently facing the wear strip.

11. A rotary platform according to claim 1, wherein said connection comprises said connection comprises a plurality of bondings (16) arranged at different positions along the circular rail member (10), each said bonding (16) holding the first part (10a, 17, 18a, b) and the second part (10b, 18c) of the rail member in a connected state.

12. A rotary platform according to claim 11, wherein the bondings are attached to the horizontal extension (10a) and to the wear strip (10b) by weld joints.

13. A rotary platform according to claim 1, wherein,
said connection comprises a plurality of bondings (16) arranged at different positions along the circular rail member (10) and
each said bonding comprises a plate member (16) having an extension between an attachment to the first part (10a) of the rail member and an attachment to the second part (10b) of the rail member.

14. A rotary platform according to claim 1, wherein the elongated wear strip (10b) comprises at least a part of the contact surface (10b") of the rail member (10).

15. A rotary platform according to claim 1, wherein said connection comprises i) two elongated rod elements (18a, b) of the first part running in a first direction and arranged side by side at a distance from each other and ii) one elongated rod element (18c) running in the first direction and positioned in the space between the rod elements (18a, b) of the first part of the rail member (10), the rod elements (18a, 18b) of the first part bearing against the wear strip of the second part, the rod element (18c) of the second part bearing against the first part.

16. A rotary platform according to claim 1,
wherein, said connection comprising metal plate pairs (16) located at intervals along the horizontal extension (10a), the plates of each plate pair located on both opposite sides of the horizontal extension (10a) and extending downward, an upper portion of each plate fixedly connected to the horizontal extension (10a), a lower portion of the plate pairs extended to be on both opposite sides of the wear strip (10b), the lower portions of the metal plates (16) preventing lateral movements of the wear strip (10b) in relation to the horizontal extension (10a), a majority of the plate pairs (16) being free of any fixed connection to the wear strip (10b).

17. A rotary parlour for milking of animals, the rotary parlour comprising:
a platform (3) having a surface to support animals (1) to be milked;
a continuously circular rail member (10), the rail member comprising
i) a first part (10a) fixedly connected to an underside of the platform, the first part having a lower surface (10a') defining a lower horizontal extension, the first part being continuously circular in plan view on the underside of the platform,
ii) a second part with a lower surface comprising a circular wear strip (10b), the wear strip having an upper wear surface (10b') and a lower wear surface (10b"), the second part being circular in plan view on the underside of the platform, and
iii) a connection (17, 18a, 18b, 18c) located between the lower surface (10a') of the first part (10a) of the rail member and the upper wear surface (10b') of the wear strip (10b) of the second part of the rail member, the connection having a lower surface (17') and an upper surface (17"),
the upper wear surface (10b') of the wear strip being nonfixedly in contact with the lower surface (17") of the connection,
the lower surface (10a') of the first part being in contact with the upper surface (17") of the connection,
the horizontal extension of the first part, the wear strip of the second part, and the connection being in vertical alignment,
said connection arranged to allow vertical angular movements between the first part (10a) and the second part (10b) of the rail member (10); and
a plurality of rolling members (11) having an upper wear rolling surface (11') in contact with the lower wear surface (10b") of the second part of the rail member (10),
wherein the platform (3) is rotatably arranged on the rolling members (11).

18. A rotary parlour for milking of animals according to claim 17, wherein,
the second part of the rail member is dismountable from the first part of the rail member,
the upper wear surface (10b') of the wear strip is nonfixedly in contact with the lower surface (17") of the connection, and
the lower surface (10a') of the first part is nonfixedly in contact with the upper surface (17") of the connection.

19. The rotary parlour for milking of animals according to claim 17, wherein,
said connection further comprises metal plate pairs (16) located at intervals along the horizontal extension (10a), the plates of each plate pair located on both opposite sides of the horizontal extension (10a) and extending downward, an upper portion of each plate fixedly connected to the horizontal extension (10a), a lower portion of the plate pairs extended to be on both opposite sides of the wear strip (10b), the lower portions of the metal plates (16) preventing lateral movements of the wear strip (10b) in relation to the horizontal extension (10a),
a majority of the plate pairs (16) being free of any fixed connection to the wear strip (10b).

20. The rotary parlour for milking of animals according to claim 19, wherein,
the lower portion of some of the plates pairs (16) are fixedly connected to the wear strip (10b), and
the lower portion of the plates (16) fixedly connected to the wear strips (10b) constitute bondings holding the horizontal extension (10a) of the first part and the wear strip (10b) of the second part (10b, 18c) of the rail member in a connected state.

21. A rotary platform according to claim 20, wherein,
the lower portion of some of the plates pairs (16) are fixedly connected to the wear strip (10b), and
the lower portion of the plates (16) fixedly connected to the wear strips (10b) constitute bondings holding the horizontal extension (10a) of the first part and the wear strip (10b) of the second part (10b, 18c) of the rail member in a connected state.

* * * * *